Figure 19:
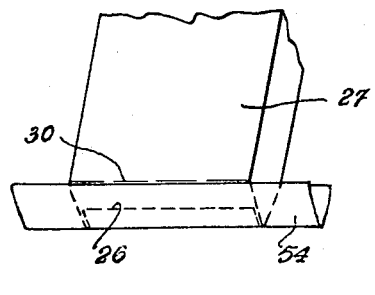

May 18, 1965 J. BOONE 3,183,797
PROCESS AND DEVICE FOR THE PRODUCTION OF A MULTIPLY TUBE
AND BAG MANUFACTURED FROM SUCH TUBE
Filed May 22, 1962 4 Sheets-Sheet 1
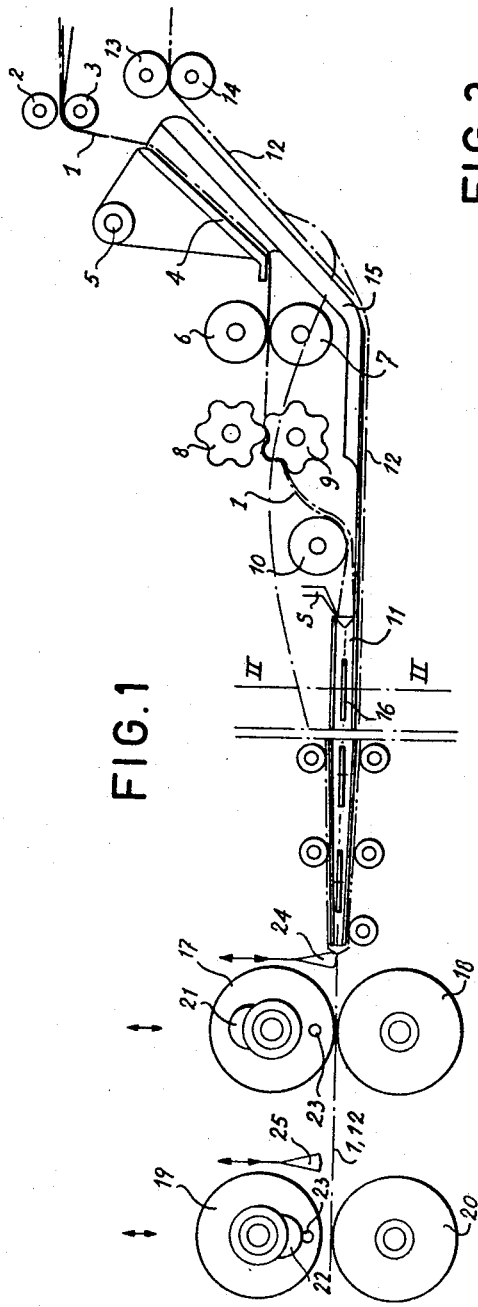
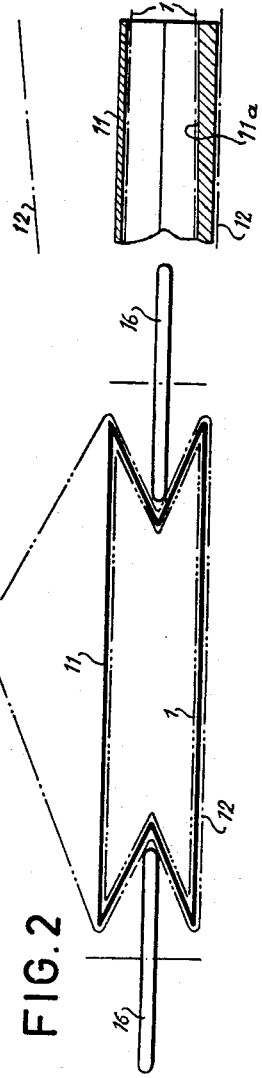
INVENTOR
JOSEPH BOONE
BY
ATTORNEYS

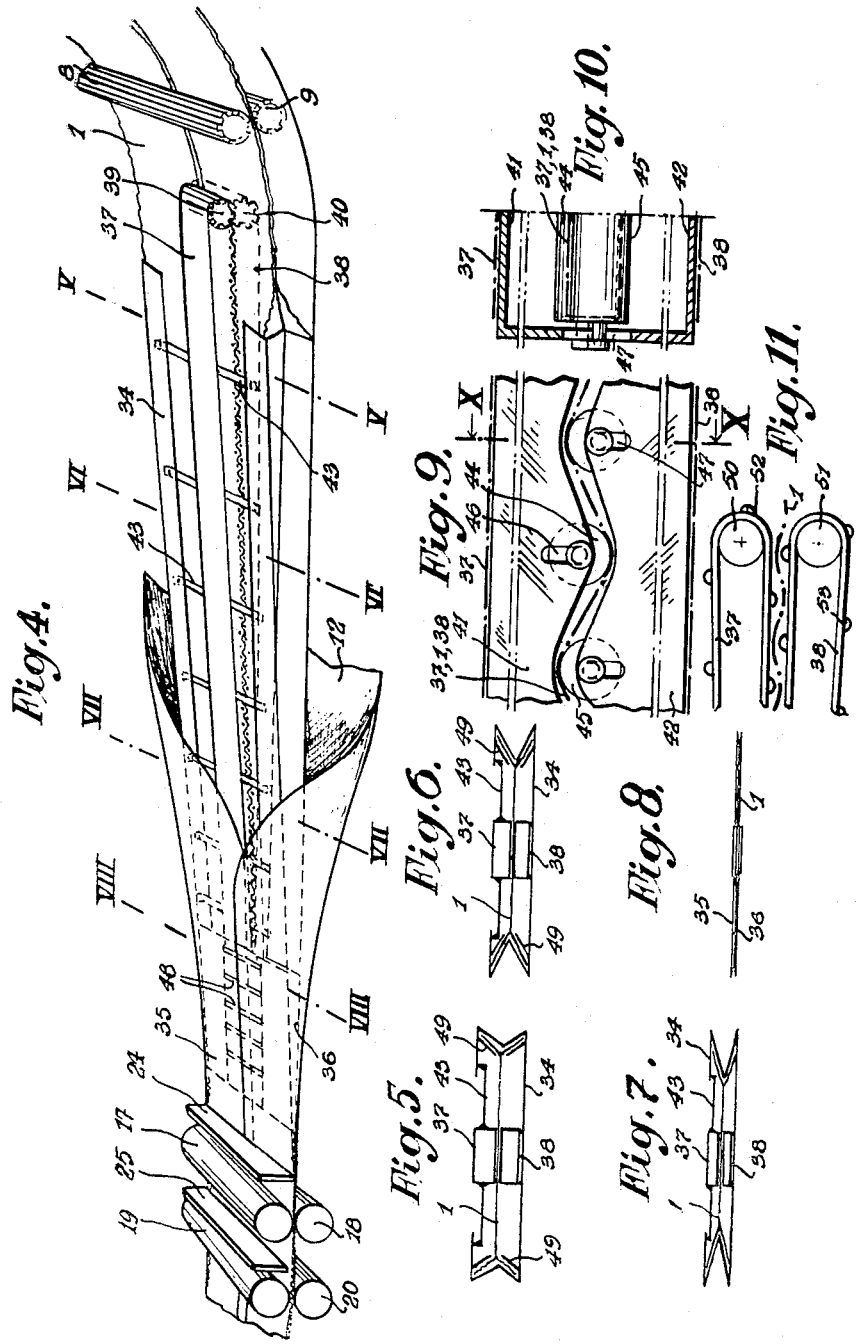

May 18, 1965 J. BOONE 3,183,797
PROCESS AND DEVICE FOR THE PRODUCTION OF A MULTIPLY TUBE
AND BAG MANUFACTURED FROM SUCH TUBE
Filed May 22, 1962 4 Sheets-Sheet 3
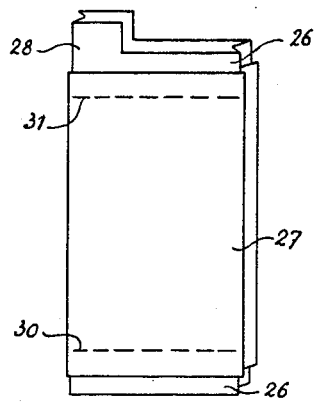
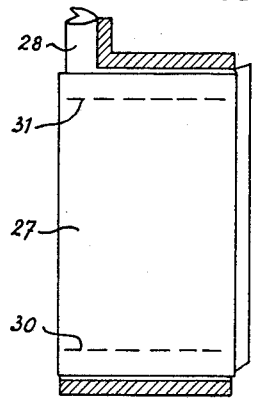
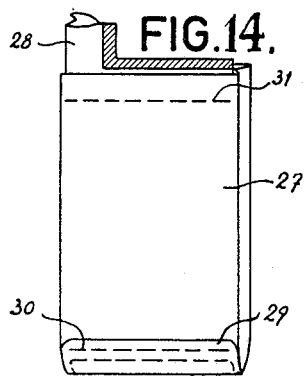
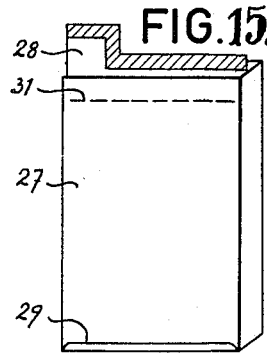
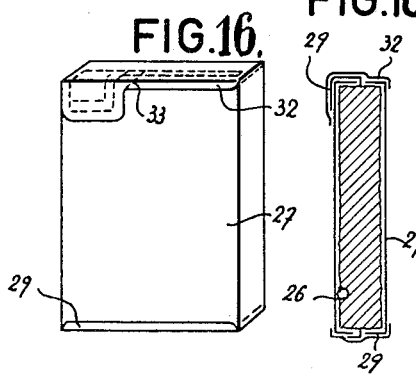
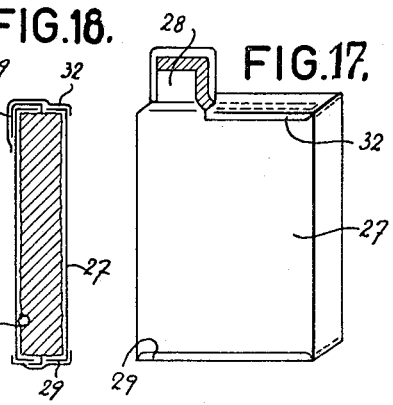
INVENTOR
JOSEPH BOONE
BY
ATTORNEYS

INVENTOR
JOSEPH BOONE

United States Patent Office 3,183,797
Patented May 18, 1965

3,183,797
PROCESS AND DEVICE FOR THE PRODUCTION OF A MULTIPLY TUBE AND BAG MANUFACTURED FROM SUCH TUBE
Joseph Boone, Vedrin, Belgium, assignor to Marius Berghgracht, Le Vieux Logis, Vineuil, St. Firmin, Oise, France
Filed May 22, 1962, Ser. No. 196,688
Claims priority, application Belgium, May 23, 1960, 604,119; Oct. 2, 1961, 608,756
23 Claims. (Cl. 93—8)

The invention relates to the production of a multiply tube, especially a large capacity bag, the innermost ply whereof has an absolute length which is greater than its apparent length, and therefore greater than the length of the outer ply or plies. The innermost ply is preferably made of impervious thermosealable or thermoweldable material, such as polyethylene or other suitable plastic material, paper treated with plastic materials, crepe paper or the like, or strong paper known as pastelboard, whereas the outer ply or plies are generally made of paper or the like.

According to the invention, a flat pre-formed tube is used to constitute the inner ply, permanent transverse undulations are imparted to the said inner tube to give it an apparent length which is smaller than its absolute length, the so deformed tube is surrounded with at least one outer ply which has a length equal to the apparent length of said inner tube and is closed upon itself around the latter, and all the plies of the so formed multiply tube are simultaneously moved forward.

According to a preferred embodiment of the invention, the transversely undulated tube is conducted through a hollow rail through which the undulated tube can be passed with small peripheral clearance, the outer ply or plies are closed upon themselves around said rail, and all the inner and outer plies are simultaneously moved forward beyond said rail.

The permanent transverse undulation of the inner tube will allow easy elongation of said tube, for example, when filling a bag made from a section of a multiply tube. For sake of facility, when reference will be made to outer plies, this will include as well a single ply as several plies.

The inner tube advantageously comprises lateral pleats or gussets. In such case, the invention provides that the hollow rail has the form of a slightly open tube of this kind and that the inner tube is conducted through the rail so that it will conform to the inner contour of the rail. The outer plies can then be folded so as to conform to the outer contour of the rail, so that on leaving the rail the gussets of the outer plies and those of the inner ply will automatically fit into one another.

The present invention also provides means for ensuring the movement of the inner tube through the rail so as to not substantially modify its apparent length. Said means are advantageously constituted by two flexible endless belts mounted within the rail and between which the median zone of the undulated tube is engaged at its entry into the rail, the neighbouring runs of the endless belts being so conducted as to remain positively in contact with said median zone of the inner tube over the greater part of the length of the rail.

A multiply tube according to the invention can be severed into sections which can each be used as a blank for forming a bag. Such blank advantageously has an inner ply projecting at the ends of the outer plies, which can be obtained automatically, according to the invention, by making the inner undulated tube of such material that the said tube has a proper elasticity and will elongate itself upon the severing of a section from the said multiply tube, so as to project somewhat beyond the ends of the outer plies, which are advantageously glued together at each end of the blank.

The invention also relates to the manufacture of bags by using blanks which can be obtained by cutting said multiply tube in sections.

Figure 20:
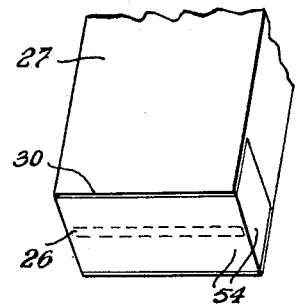
Figure 21:
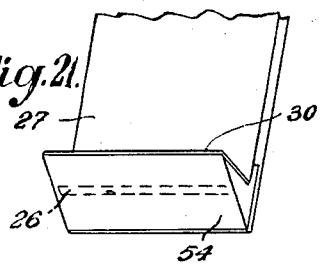
Figure 22:
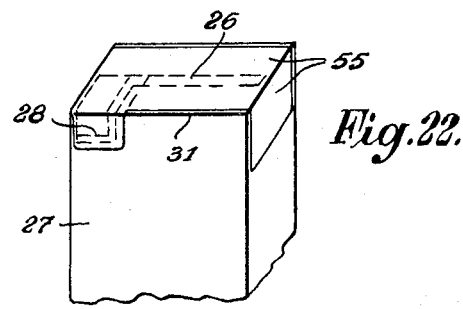
Figure 23:
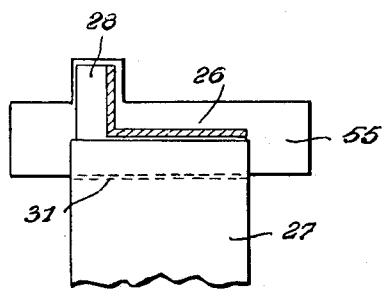

Other features and advantages of the invention will be brought out from the description which will be given hereinafter with reference to the attached diagrammatic drawings wherein:

FIGURE 1 is a side view of part of a machine for continuous formation of a multiple-envelope tube,
FIGURE 2 is a view on a larger scale in cross-section on the line II—II of FIGURE 1,
FIGURE 3 is a fragmentary view in longitudinal vertical section of a modified form of embodiment of the member shown in FIGURE 2,
FIGURE 4 is a perspective view of one form of embodiment of an apparatus according to the invention,
FIGURES 5 to 8 are sectional views on the lines V—V to VIII—VIII of FIGURE 4,
FIGURE 9 is a side view, on a larger scale, of a detail of this embodiment,
FIG. 10 is a partial sectional view taken on the line X—X of FIGURE 9,
FIGURE 11 is a partial view of another form of embodiment of part of the apparatus,
FIGURE 12 is a perspective view of a blank for the formation of a valve bag from a length of multiply tube produced according to the invention,
FIGURES 13 to 17 show the successive stages of treating the bag and closing it after filling,
FIGURE 18 is a vertical sectional view of a bag according to FIGURE 16,
FIGURE 19 is a view of the bottom of a bag, partly opened, according to another embodiment,
FIGURE 20 shows the opened bottom,
FIGURE 21 shows one possible method of folding the bottom,
FIGURE 22 is an end view of the closure of a bag, and
FIGURE 23 shows an end of this kind before closure.

The device illustrated has been especially designed for the manufacture of a tube whose inner and outer plies are provided with lateral pleats or gussets, but it will be obvious that the invention also include the manufacture of tubes without such pleats or only the inner ply whereof is provided with such pleats.

In the drawings, 1 designates a flat tube, for example, provided with lateral pleats, which tube will constitute the inner ply of the multiply tube and has been pre-formed in any appropriate manner, for instance from a band or web of plastic material or paper treated with plastic materials or the like, longitudinally sealed, is conducted in between guide rollers 2, 3. The tube is conducted along a guide 4 which is supported at 5, and this tube then passes between driving cylinders 6, 7 and two fluted cylinders 8, 9 which impart a permanent undulation to the tube 1. The latter passes over a guide roller 10, which can be fluted, if desired, and then penetrates into a hollow rail 11 whose cross-section is shown in FIGURE 2. The tube 1 conforms to the inner contour of the rail 1 and in order to facilitate this conformation it is possible to use, for example, lateral guides which progressively open the pleats of the tube.

In order to facilitate the advance of the tube 1 within the rail 11, it is advantageous to provide blowing means, (for example one or more nozzles S) which blow air under pressure in between the tube 1 and the inner wall of the rail. For the same purpose, it is advantageous to give the lower inner wall of the rail 11 an inclination as shown at 11a (FIGURE 3) so that this wall descends progressively from the entrance of the rail onwards.

One or more webs 12 of paper or the like which will form the outer plies of the bag are fed through between guide rollers 13, 14. They pass over a guide 15 which serves to support the rail 11 and is fast with the guide 4. As a result, the web or webs 12 are folded so that their edges are raised. They then pass about the rail 11 and are pushed into the lateral hollows therein by discs 16 or the like, in order to form pleats similar to those of the tube 1. The free edges of the webs 12, previously coated with glue, are folded over the rail and are thus glued together by the use of any suitable known means. The inner ply 1 and the outer plies are combined with one another on issuing from the rail 11, and are flattened so that their pleats fit perfectly into one another. The assembly of plies then passes between successive pairs of driving cylinders, in the present case two pairs 17, 18 and 19, 20, whose peripheral speed is lower than that of the cylinders 6, 7, more particularly to the extent by which the fluted cylinders 8, 9 reduce the apparent length of the tube 1 (for example by a few percent). The cylinders 17 and 19 are mounted so as to be vertically movable to and fro, this being brought about, for example, by cams 21, 22 fast with the cylinders and co-operating with fixed rollers 23. In this way, the assembly of inner ply 1 and outer plies 12 will be driven alternatively by the cylinders 17, 18 and the cylinders 19, 20. Pressure bars 24 and 25 are associated with these two pairs of cylinders and follow the vertical reciprocating movement of the said cylinders, so that when the cylinders 17, 18 (or 19, 20) are in the driving position, the bar 24 (or 25) exerts a pressure on the assembly of plies 1 and 12 and, whilst holding them, repels the undulations of the inner ply 1 so that the cylinders 17, 18 (or 19, 20) acting as driving cylinders will not crush the undulations of the inner ply 1 and produce incorrect folds. When the cylinders 17, 18 move apart, the pressure bar 24 ascends at the same time and allows the passage of the undulations which had accumulated and which will then accumulate in front of the pressure bar 25 which has meanwhile been lowered. When the cylinders 19, 20 move apart from one another, the bar 25 is raised and allows the passage of the undulations without the latter being crushed by the cylinders 17, 18 and 19, 20.

The multiply tube delivered by the cylinders 19, 20 is then cut up in lengths which can each be used for the manufacture of a bag. The difference between the absolute length and the apparent length of the inner ply will of course depend on the size of the undulations imparted to this ply by the cylinders 8, 9 and the difference between the linear peripheral speeds of the cylinders 6, 7 and 17, 18, 19, 20. These factors can be modified in accordance with actual requirements.

In the device shown in FIGURES 4 to 10, the tube 1 which has been undulated by the fluted cylinders 8, 9 is positively supported whilst it passes through the hollow rail 34. The latter has a cross section similar to that of the rail 11 (FIGURES 1–2), but it is, however, open over the central portion of its upper wall, so as to facilitate control of the entrainment of the inner ply in the rail. The end of the rail where the closing of the outer plies is effected is constituted by two convergent spaced-apart metal sheets 35, 36 which, in the case where the outer plies are provided with pleats, are arranged beyond the point at which the formation of these pleats is completed, and these pleats then come to be situated in the free spaces left between the lateral edges of the metal sheets 35, 36.

In the central portion of the rail, and over the greater part of the length thereof, there are arranged two flexible endless belts 37, 38 which are made, for example, of rubber, rubberized canvas or thin flexible metal, for example sheet steel. The outer surface of these belts is preferably of a non-slip type, it being, for instance, roughened or covered with a rough coating, so as to have a high resistance to slipping. At one of their ends, the belts are conducted over rollers, 39, 40 which may be provided with fluting similar to that of the cylinders 8, 9. At their other end, they are conducted over very thin rollers, so that the runs of each belt converge. The upper belt is advantageously shorter than the lower belt. In the hollow spaces of the two belts there are arranged supports 41, 42, which are, for example, of U-shaped cross-section, the open ends of the two U's being contiguous and terminating in mutually spaced-apart undulated edges. These supports are fixed to the rail 34 by fittings such as 43. Series of freely rotating rollers 44, 45 are mounted in the said supports, on spindles whose ends are fixed in slots 46, 47. The median portion of the tube 1 and the neighbouring runs of the belts 37, 38 follow an undulatory path of travel determined by the rollers 44, 45, whose position can be regulated according to requirements in each particular case by means of the slots 46, 47.

The small return roller of the upper belt 37 is arranged at one of the windows 48 provided in the upper metal sheet 35, the return of the belt being effected, therefore, along the upper face of the metal sheet 35. A similar arrangement is provided for the lower belt 38 and the corresponding metal sheet 36. The said windows are formed in a wide shallow groove of each of the metal sheets 35, 36, so as not to hinder the movement of the outer plies 12.

Any desired means can be provided for controlling the movement of the belts 37, 38, for example by making the rollers 39, 40 act as driving rollers, at such speed that the apparent length of the undulated tube 1 will not be substantially modified during its passage through the hollow rail. The space between the undulated edges of the supports 41, 42 will be sufficient to allow the two edge portions of the inner tube 1 to project freely in the lateral sense.

The longitudinal closing to the outer plies will be effected beyond the last window 48. The part at the left of the latter in FIGURE 4 can therefore be longer than shown in this figure.

FIGURES 5 to 7 show that in proportion as the rail 34 becomes narrower, its lateral grooves become deeper in order to permit the progressive formation of the pleats in the outer plies 12. At the same time, the pleats of the inner tube 1 are applied against the inner wall of the said grooves, these pleats being advantageously guided over a certain distance from the entrance to the rail by guide plates 49 (FIGURES 5 and 6) fixed to the interior of the rail. The endless belts 37, 38 converge similarly to the convergence of the rail, so that the general plane of the tube 1 will always remain half-way up the height of the rail.

The invention can also be carried into effect without using the rollers 44, 45, so that the neighbouring runs of the two endless belts will follow a straight path of travel. The rollers 39, 40 will then be replaced by smooth rollers 50, 51, as shown in FIGURE 11. In this case a sufficient spacing is maintained between the rollers 50 and 51 and between the neighbouring runs of the belts 37 and 38 so as not to crush the undulations previously imparted to the inner tube 1, but to nevertheless exert a slight pressure perpendicularly thereto so as to effect a positive contact between the endless belts and the peaks of the undulations of the tube 1. Such an arrangement is particularly suitable in cases where the material constituting the inner tube is relatively rigid, for example made of pasteboard.

In the case of FIGURE 11, the belts 37, 38 can be provided at their outer face with transverse ribs 52, 53 whose spacing corresponds to that of the permanent undulations of the tube 1.

The apparatus according to FIGURE 11 has the advantage of producing practically no crushing, nor deformation of the permanent undulations which have previously been formed on the inner tube.

FIGURES 12 to 18 show the formation of a multiply bag in a way which is particularly suitable, although not exclusively, for the production of such bags from lengths of multiply tubing whose inner ply has a greater absolute length than the other plies. The starting blank is shown in FIGURE 12, this being obtained by cutting off a length from multiply tubing. The inner ply 26 projects beyond the outer plies 27 at both ends. These projections can be automatically obtained by the process described hereinbefore. It is merely necessary for the material of the inner tube 1 to be such that the undulated tube tends to elongate itself under the action of the elastic tension of the undulations, so that after the cutting of the length of tubing the inner ply elongates itself to the desired length and partly issues from the outer plies, whilst retaining undulations of the desired size. It will be advantageous to combine the cutting device with one or more pressure rollers which hold the assembly of plies in position until the instant of cutting. Furthermore it will be advantageous to provide a local fastening between the inner ply and the outer plies, more particularly by means of gluing at a central point of the length of tubing, the position of this point being determined in dependence on the desired relative length of the projecting portions of the inner ply from the two ends of the length of tubing. The ends of the outer plies are advantageously glued together. The upper end of the inner ply can be cut so as to exhibit at one side a projecting portion 28 intended for the formation of a valve. The bottom of the inner ply is welded or sealed over its entire length, whilst its upper end is sealed so as to leave open only the end of the valve 28, as shown in FIGURE 13. Then the bottom of the inner ply is folded over the adjoining portion of the outer ply and is covered by a label 29 of strong paper, cloth or the like (FIGURE 14). Then the bag is filled and opened in the form of a parallelipiped, the two edges of each end of the outer plies coming to be situated one opposite the other, whilst the corresponding projecting portion of the inner ply passes between these two edges. The opening-flat of the bottom is ensured by providing folding lines 30 formed parallel to the end of the outer plies 27, at a distance equal to half of the total width of an opened lateral pleat. Similar folding lines 31 are formed at the other end of the bag. After filling, the valve 28 is closed by sealing (FIGURE 15). Then the upper end is folded along the folding lines 31, the end of the inner ply being folded over the outer ply and covered by a label 32 (FIGURE 16). The valve 28 and the part of the label 32 which covers it are glued by means of a detachable adhesive glue and perforations 33 are provided in the label in order to facilitate the detaching of the valve in order to empty the bag, as shown in FIGURE 17.

For a bag without a valve, both ends are closed in the manner of the bottom of the bag described hereinbefore.

As FIGURE 18 shows, the greater absolute length of the inner ply prevents any pulling or stresses on the weldings at the ends of the bag. It is also possible to avoid subjecting the longitudinal joint of the inner ply to stressing if the inner ply is given a larger contour than the outer plies, more particularly by eliminating the pleats of the outer plies or making them less deep than those of the inner ply.

In the embodiment shown in FIGURE 19, the projecting end of the inner ply 26 is folded over an end of the outer plies 27 and a label 54 made of strong paper or composed of several sheets of paper connected together by lines of glue carefully localised to keep the label easily flexible, or made of canvas or the like, is glued on to the bottom so as to project at the two lateral ends (FIGURE 19). When the bag is filled and the bottom is open along the folding lines 30, the projections of the label 54 are glued to the sides of the bag which are formed by the opened-out pleats (FIGURE 20). It is also possible to fold the bottom after its production as shown in FIGURE 21 in order to facilitate the conditioning operation which the user is to carry out.

After filling, the other end of a valveless bag can be closed in the same way as the bottom described hereinbefore.

FIGURE 22 shows the closure of a bag comprising a valve 28, folded in accordance with the folding lines 31. A label 55 reinforces the closure end, in a manner similar to the label 54, but it can be provided with a lateral extension covering the valve.

The labels 54, 55 are preferably of a length which is almost equal to the thickness of the filled bag, that is to say the thickness of its opened-out lateral pleats. FIGURE 23 shows a label 55 partly fixed to the bag before closing.

What I claim is:

1. A process for the continuous production of a multiply tube of paper or the like, with an inner ply having a greater absolute length than its apparent length and one or more outer plies having a length corresponding to the apparent length of the inner ply, comprising the steps of using a preformed flat tube to constitute the inner ply, imparting a speed of forward movement to said flat tube, producing permanent tranverse undulations to said flat tube, thereby to give it a smaller apparent length than its absolute length, surrounding the thus obtained undulated tube with outer plies and longitudinally closing said outer plies upon themselves around said undulated tube, and simutaneously moving forward the assembly of inner and outer plies of the so obtained multiply tube at a speed such that the ratio between the latter speed and said speed imparted to said flat tube substantially corresponds to the ratio between said apparent length and said absolute length.

2. A process as claimed in claim 1, characterized by the use of an inner tube made of such material that, after having been undulated, it has a tendency to elongate itself so as to automatically project beyond the ends of the outer plies upon severing the multiply tube in sections.

3. A device for the continuous production of a multiply tube of paper or the like comprising means for imparting a speed of forward movement to a flat tube intended to form the inner ply of said multiply tube, means for imparting permanent transverse undulations to said flat tube, thereby to convert it into an undulated inner tube, a hollow guide rail, means for introducing the undulated inner tube into said rail, means for folding and longitudinally closing upon themselves around said rail webs of paper or the like intended to form the outer plies of said multiply tube, and means arranged beyond the exit of said rail for simultaneously moving forward the said inner tube and outer plies at a speed substantially corresponding to the forward speed of said undulated inner tube.

4. A device as claimed in claim 3 for using an inner tube provided with lateral pleats, characterized in that the hollow rail includes two mutually spaced parallel sides of substantially equal breadth having their longitudinal edges interconnected by sides each having a cross section in the form of a V with the apex directed towards the inside of the rail, so that the inner tube when partially open can conform to the inner contour of the rail.

5. A device as claimed in claim 4, characterized in that it includes means for forming pleats in the outer plies by conforming them to the outer contour of the rail.

6. A device as claimed in claim 3, characterized in that it includes means for blowing air under pressure between the inner tube and the inner wall of the hollow rail, in the direction of advance of said tube.

7. A device as claimed in claim 3, characterized in that the lower inner wall surface of the hollow rail descends gradually from the entrance of the rail onwards.

8. A device as claimed in claim 3, characterized in that it includes two flexible endless belts arranged in substantially parallel relationship within the rail and between the neighbouring runs whereof a median zone of the undulated inner tube can be engaged, the said neighbouring runs of the endless belts being conducted so as to remain positively in contact with the said median zone of the said tube over the greater part of the length of the rail.

9. A device as claimed in claim 8, characterized in that the endless belts are driven at such a speed that the apparent length of the inner tube is not substantially modified during its passage through the rail.

10. A device as claimed in claim 8, characterized in that the surface of the belts which is intended to come into contact with the median zone of the inner tube is of a non-slip nature.

11. A device as claimed in claim 8, characterized in that the neighbouring runs of the two belts are conducted along a rectilinear path of travel and with such mutual spacing as to exert a slight pressure on the peaks of the undulations of the inner tube.

12. A device as claimed in claim 8, characterized in that the neighbouring runs of the two belts are conducted along a rectilinear path of travel and the belts are provided with transverse ribs penetrating into the undulations of the inner tube.

13. A device as claimed in claim 8, characterized in that the sides of the rail facing the endless belts converge in the direction of the advance of the inner and outer plies of the tube, and the two runs of each endless belt converge in the same direction.

14. A device as claimed in claim 13, characterized in that the said converging sides of the rail are prolonged by two spaced-apart metal sheets provided each with at least one window through which passes the corresponding endless belt, whose outer run extends externally of the corresponding metal sheet.

15. A device as claimed in claim 14, characterized in that the said windows are arranged in grooves in the said metal sheets.

16. A device as claimed in claim 14, characterized in that each endless belt passes about a driving roller arranged at the entrance of the rail and a thin return roller arranged opposite to one of said windows.

17. A device as claimed in claim 8, characterized in that the hollow rail comprises a lateral aperture unmasking at least the greater part of one of the said endless belts.

18. A device as claimed in claim 8, characterized in that within the endless belts there are arranged two hollow supports fixed to the rail and having spaced-apart undulated edges, series of rollers being arranged in the vicinity of these edges to define an undulatory path of travel for the neighbouring runs of the endless belt and the median zone of the inner tube comprised between these runs.

19. A device as claimed in claim 18, characterized in that each of said rollers is mounted on a spindle fixed in an adjustable position in slots of the corresponding support.

20. A device as claimed in claim 18, characterized in that the driving rollers for the endless belts are mounted on one end of the said supports and are fluted.

21. A device as claimed in claim 3, characterized in that the means for imparting a speed of forward movement to the multiply tubing assembly beyond the rail comprises two successive pairs of driving cylinders, the cylinders of each pair being arranged on opposite sides of said multiply tube assembly and each said pair being associated with a pressure bar arranged upstream thereof, one of said pairs of driving cylinders and its associated pressure bar being spaced from said multiply tubing assembly while the other pair of driving cylinders and its associated pressure bar are pressed against said multiply tubing assembly, and means for periodically moving into contact with said multiply tubing assembly the pair of driving cylinders and the associated pressure bar which were spaced from said assembly and simultaneously moving away therefrom the pair of driving cylinders and the associated pressure bar which were in contact with said assembly.

22. A device for the continuous production of a multiply tube of paper or the like, characterized in that it includes means for imparting a speed of forward movement to a flat preformed tube intended to form the inner ply of said multiply tube, means for imparting permanent transverse undulations to the so forwarded flat tube, thereby to convert it into an undulated tube having an apparent length smaller than the length of said flat tube, a hollow guide rail, means for introducing the undulated inner tube into said rail, means for folding and longitudinally closing upon themselves around said rail webs of paper or the like to form the outer plies of said multiply tube, and means arranged beyond the exit of said rail for simultaneously moving forward the said inner tube and outer plies at a speed such that the ratio between the latter speed and the said speed imparted to said flat tube substantially corresponds to the ratio between the apparent length of said undulated tube and the length of said flat tube.

23. A device as claimed in claim 22, characterized in that it includes two fluted cylinders for imparting permanent undulations to the inner tube before it is introduced into the hollow rail.

References Cited by the Examiner

UNITED STATES PATENTS

| 2,087,444 | 7/37 | Potdevin | 93—8 |
| 2,180,431 | 11/39 | Robinson | 93—8 |
| 2,751,140 | 6/56 | Brady | 229—55.307 |
| 2,773,636 | 12/56 | Williams et al. | 229—55.313 |
| 2,803,173 | 8/57 | Doyle | 93—35 XR |

FRANK E. BAILEY, *Primary Examiner.*

FRANKLIN T. GARRETT, *Examiner.*